(12) United States Patent
Mochizuki et al.

(10) Patent No.: US 7,758,218 B2
(45) Date of Patent: Jul. 20, 2010

(54) VEHICULAR HEADLAMP

(75) Inventors: Kiyotaka Mochizuki, Shizuoka (JP);
Takashi Hori, Shizuoka (JP); Naohisa Tatara, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 30 days.

(21) Appl. No.: 11/824,964

(22) Filed: Jul. 3, 2007

(65) Prior Publication Data
US 2008/0007961 A1    Jan. 10, 2008

(30) Foreign Application Priority Data
Jul. 5, 2006    (JP)    ............... 2006-185158

(51) Int. Cl.
*B60Q 1/00*    (2006.01)
(52) U.S. Cl. ................. 362/465; 362/466; 362/467; 362/544; 362/526; 362/528
(58) Field of Classification Search ................. 362/465, 362/466, 467, 544, 526, 528
See application file for complete search history.

(56) References Cited
U.S. PATENT DOCUMENTS

| | | | |
|---|---|---|---|
| 6,882,110 B2 | 4/2005 | Ishida et al. | |
| 7,112,925 B2 * | 9/2006 | Numajiri et al. | ............... 315/82 |
| 7,318,662 B2 * | 1/2008 | Takeda et al. | ............... 362/475 |
| 2004/0125614 A1 * | 7/2004 | Ishida et al. | ............... 362/509 |
| 2004/0257820 A1 * | 12/2004 | Kletensky et al. | ........... 362/465 |
| 2005/0180139 A1 | 8/2005 | Takeda et al. | |

FOREIGN PATENT DOCUMENTS

JP    2005-324657    11/2005

* cited by examiner

*Primary Examiner*—Sandra L O'Shea
*Assistant Examiner*—Jessica L McMillan
(74) *Attorney, Agent, or Firm*—William L. Androlia; H. Henry Koda

(57) ABSTRACT

A vehicular headlamp including a light amount control device that controls the amount of light from at least two of a plurality of light source units each having a light-emitting element as the light source. The light amount control device performs a contrasting control of the lamp to increase the amount of light from at least one of the light source units and decrease the amount of light from the other light source unit, thus enhancing the visibility by increasing the amount of light from one light source unit and enhancing the brightness in an area that the unit illuminates, and decreasing the amount of light from the other light source unit that illuminates an area where visibility is required less, lowering the power consumption.

6 Claims, 8 Drawing Sheets

VEHICULAR HEADLAMP

BACKGROUND OF THE INVENTION

1. Field of the Invention

The present invention relates to a vehicular headlamp having a plurality of light source units and more particularly to a vehicular headlamp capable of controlling various light distribution patterns in response to changes in the vehicle's driving status and achieving lower power consumption.

2. Description of the Related Art

Headlamps equipped with light source units that have light-emitting diodes (LEDs), laser diodes (LDs), or similar semiconductor light-emitting elements as their light sources have been proposed for use in vehicles. In such headlamps, a plurality of light source units are used in combination, since light emitted from a single light source unit is not sufficient to provide a required amount of light; and in addition, irradiation ranges of such light source units are set to be different so that by way combining them an upper beam pattern (a high beam distribution pattern) and a lower beam pattern (a low-beam distribution pattern) are created.

For example, U.S. Pat. No. 6,882,110 discloses a technology for providing a low-beam distribution pattern by combining a cut-off line forming light source unit, a hot zone forming light source unit, and a diffusion region forming light source unit, and it further discloses a technology for adjusting to various low-beam distribution patterns by changing combinations of the light source units. Japanese Patent Application Laid-Open (Kokai) No. 2005-324657 discloses a technology for controlling current supplied to some of LEDs installed in a headlamp depending on vehicle speed and separately controlling current supplied to the other LEDs, so that the light distribution characteristics such as irradiation ranges and directions can be adjusted. Further, United States Patent Application No. 2005180139 discloses a technology for providing different light distribution characteristics by varying the ratios of the amount of light emitted by each one of the LEDs.

According to U.S. Pat. No. 6,882,110, since the light distribution patterns are uniformly determined by combinations of the plurality of light source units installed in the headlamp, it is difficult to change the light distribution patterns in response to the changes in driving status of the vehicle.

On the other hand, in Japanese Patent Application Laid-Open (Kokai) No. 2005-324657 and United States Patent Application No. 2005180139, electric current supplied to the LEDs is controlled so as to change the brightness of the LEDs and thus to change the light distribution patterns. In these conventional lamps, the light distribution patterns are changed in response to the changes of the driving status of the vehicle. However, in these Japanese related art, since the current supplied to some of the LEDs is increased or decreased, the amount of light emitted from the LEDs increases or decreases accordingly, resulting in that the total amount of light emitted from the headlamp a becomes higher or lower. This means that the brightness in the vehicle's front area illuminated by the headlamp varies depending on the changing light distribution patterns, making the driver sometimes feel discomfort. The driver even feels unease particularly when the brightness in the vehicle's front area is lowered. As a result, Japanese Patent Application Laid-Open (Kokai) No. 2005-324657 and United States Patent Application No. 2005180139 in fact increase the amount of light emitted from the LEDs but does not decrease the amount of light emitted from the LEDs in order to secure the safety for driving conditions. However, when the amount of light from the LEDs increases, the power consumption of the headlamp increases, resulting in that the burden on the vehicle's battery becomes higher.

BRIEF SUMMARY OF THE INVENTION

Accordingly, it is an object of the present invention to provide a vehicular headlamp that prevents increase of power consumption while creating right light distribution patterns suitable for the driving status of vehicles.

The above object is accomplished by a unique structure of the present invention for a vehicular headlamp that includes a plurality of light source units each having light-emitting elements as light sources thereof and synthesizes the illumination light emitted from each of the light source units to create a predetermined light distribution pattern; and in this structure, a light amount control means for controlling the amount of light from at least two of the light source units is further provided in the headlamp, and the light amount control means performs a contrasting control to increase the amount of light from at least one of the light source units and decrease the amount of light from at least another of the light source units.

In this structure, the light source units include a first light source unit that illuminates an area in the proximity of the optical axis of the lamp and a second light source unit that illuminates an area that is greater than and includes the area where the first light source unit illuminates, and the amount of light from the first light source unit and the amount of light from the second light source unit are controlled in a contrasting or opposing manner.

It is preferable that the first light source unit include a condenser-type light source unit, and the second light source unit include a diffusion-type light source unit.

In the vehicular lamp of the present invention, the amount of light from one of the light source units is increased, and it is thus possible to increase the brightness for an area that the light source unit illuminates and to enhance the visibility in that area, creating desirable light distribution patterns for safe driving in response to the changes in vehicle driving status. On the other hand, the amount of light that illuminates an area where the visibility is less required during the vehicle operation is decreased, thus preventing the increase in power consumption while securing the illumination required for safe vehicle operation.

In the present invention, in a middle-beam mode of the vehicle, the amount of light from the first light source unit is increased while the amount of light from the second light source unit is decreased. It is, therefore, possible to enhance the visibility in an area that is far in front of the vehicle in the middle-beam mode, providing a light distribution pattern which is suitable for high-speed driving. Furthermore, in a town mode of the vehicle, the amount of light from the first light source unit is decreased while the amount of light from the second light source unit is increased. As a result, the visibility in an area just in front of the vehicle in the town mode is enhanced, and the visibility of pedestrians and road corners is increased. It is, therefore, possible to provide a light distribution pattern that is suitable for urban driving.

In the vehicular lamp of the present invention, it is preferable to include a leveling control means that controls to deflect the optical axes of the plurality of light source units in the vertical direction, and it is further preferable that the leveling control means be designed so that it controls to deflect the optical axes of the plurality of light source units upwardly in the middle-beam mode and to deflect the optical axis downwardly in the town mode. It is, therefore, possible to further enhance the visibility in an area that is far in front of the vehicle for high-speed driving and to further enhance the visibility in an area right in front of the vehicle for low-speed driving.

DETAILED DESCRIPTION OF THE INVENTION

Hereinafter, embodiments of the present invention will be described with reference to the accompanying drawings.

Figure 1:
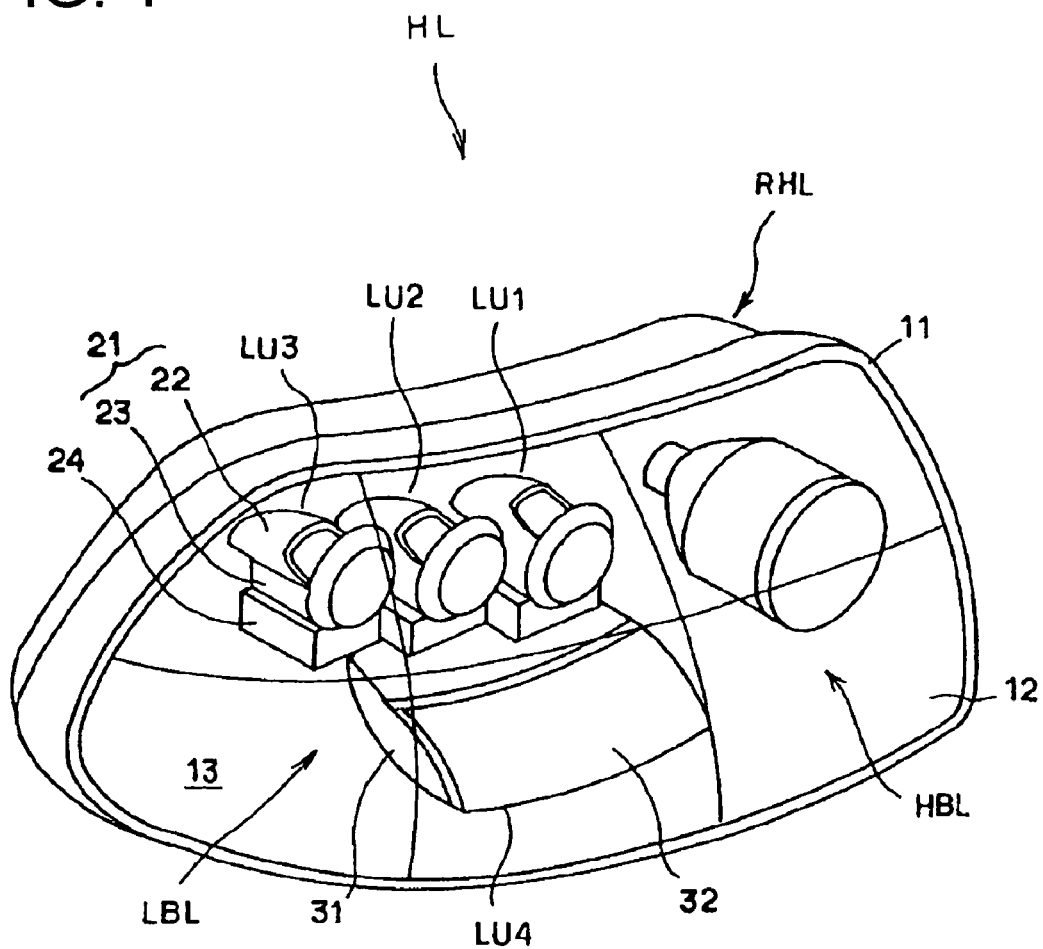
FIG. 1 is a perspective view of the exterior appearance of a headlamp according to one embodiment of the present invention.
Figure 2:
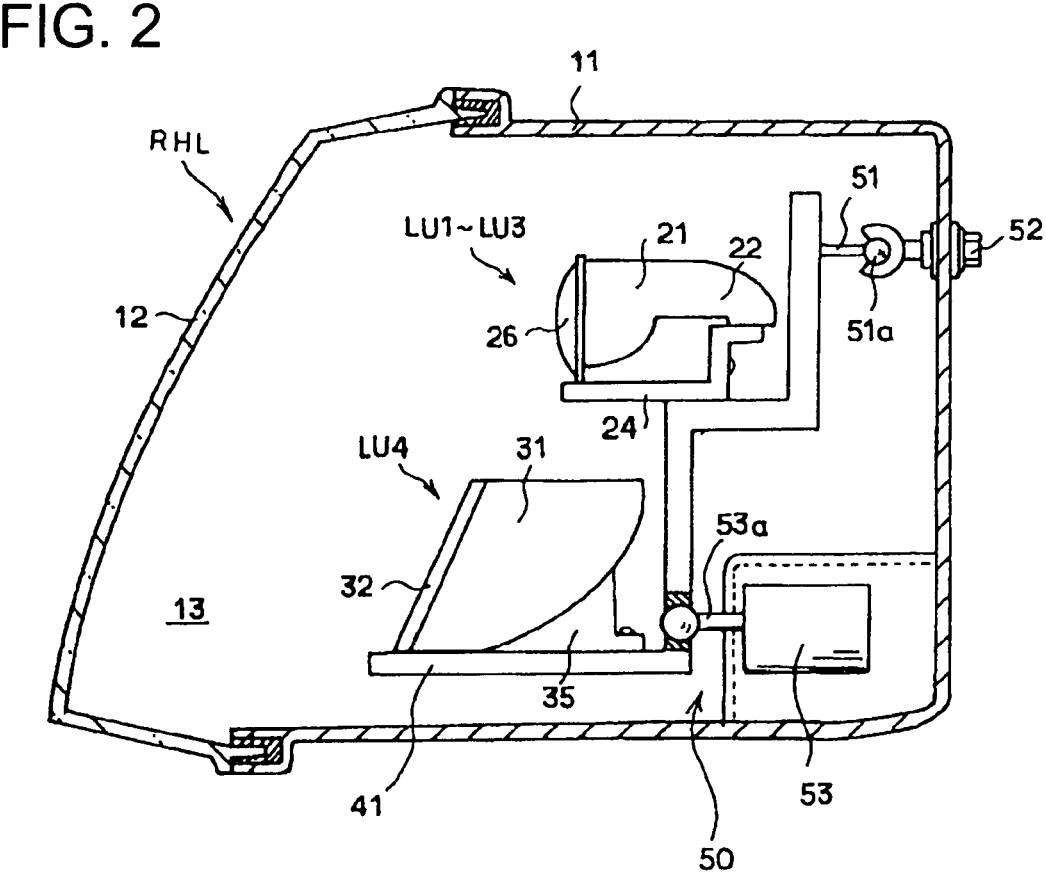
FIG. 2 is a schematic vertical cross section of the headlamp of FIG. 1.

FIG. 1 is a perspective view of the right side headlamp RHL, which is one of a pair of headlamps HL to be mounted on the right and left front corners of a vehicle. FIG. 2 is a schematic sectional view of the headlamp along its optical axis.

In this lamp, a lamp chamber 13 is defined by a lamp body 11 and a transparent cover 12 fitted on the front opening of the lamp body 11; and in this lamp chamber 13, a high-beam lamp HBL for creating a high-beam distribution pattern and a low-beam lamp LBL for creating a low-beam distribution pattern are installed.

The high-beam lamp HBL has a structure of a single projector-type lamp equipped with a discharge bulb as its light source. Since such a projector-type lamp having a discharge bulb as its light source is widely known, a detailed description thereof will be omitted.

The low-beam lamp LBL has a structure of a multi light source lamp in which a plurality of light source units (four light source units LU1 to LU4 in the shown embodiment), each having an LED as a semiconductor light-emitting element serving as a light source, are installed and aligned. Of the four light source units LU1 to LU4, three light source units LU1 to LU3 are of a condenser type, and the other light source unit LU4 is of a diffusion type. The three condenser-type light source units LU1 to LU3 are provided horizontally on the upper step in the lamp chamber 13, while the diffusion-type light source unit LU4 is provided on the lower step.

Figure 3A:
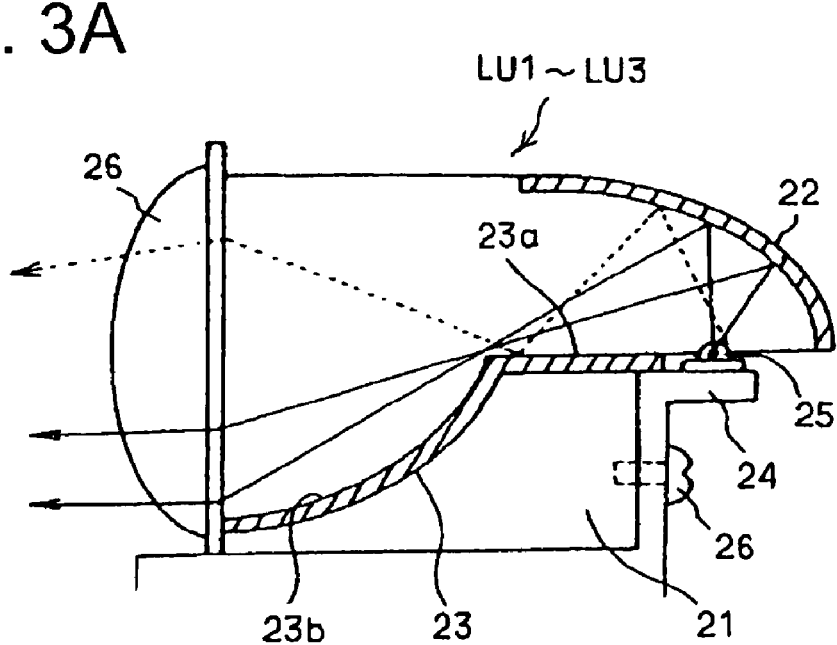
FIGS. 3A and 3B are schematic sectional views of a condenser-type light source unit and a diffusion-type light source unit, respectively, used in the headlamp of the embodiment of the present invention.

As seen from FIG. 3A, which is a sectional view taken along the optical axis of three condenser-type light source units LU1 to LU3, each light source unit has a reflector block 21.

The reflector block 21 integrally includes a main reflector 22 serving as part of a rotational ellipsoid and a sub-reflector 23 extending frontward along the lower edge of the main reflector 22. The sub-reflector 23 includes a flat portion 23a, which is substantially flat, and a concave portion 23b, which is provided at a further front side than the flat portion 23a. The concave portion 23b is curved downwardly in a concave shape so that light is not reflected.

To the reflector block 21, a stem tube 24 is fitted by a screw 26; and a plurality of LEDs 25, which are the light sources, are mounted on the stem tube 24. On the front end of the reflector block 21, a lens 26 is provided to face the LEDs 25.

The plurality of LEDs 25 are provided in the proximity of a first focal point of the main reflector 22, and the sub-reflector is positioned so that the boundary of the flat and concave portions thereof is in the proximity of a second focal point.

In each of the condenser-type light source units LU1 to LU3, light emitted from the LEDs 25 is reflected on the inner face of the main reflector 22, condensed on the second focal point, and then condensed by the lens 26 to be radiated forward. Part of the light reflected on the main reflector 22 is, as shown with dashed lines in FIG. 3A, reflected on the flat portion 23a of the sub-reflector 23, then condensed by the lens 26, and radiated forward. It is, therefore, possible to make an efficient use of light emitted from the LEDs 25 as illumination light and enhance the irradiation efficiency.

While not shown in FIG. 3A, the LEDs 25 in one condenser-type light source unit LU1 on the center side (see FIG. 1) of the vehicle have an integral structure made of two LED chips.

The LEDs 25 of each of the condenser-type light source units LU2 and LU3 on the outer side have an integral structure comprising four LED chips. When the condenser-type light source units LU1 to LU3 are lit, the plurality of LED chips emit light all at once, and light beams emitted from LED chips are superposed to form a luminous flux.

Figure 4A:
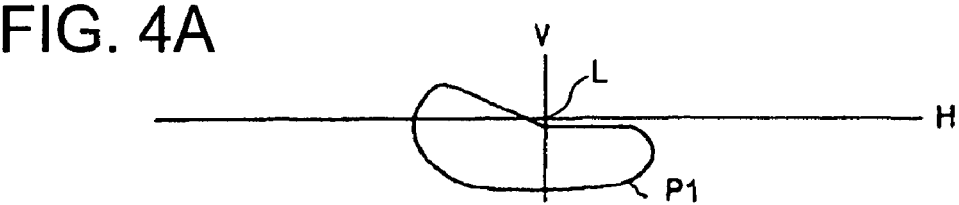
FIGS. 4A through 4E show the irradiation ranges of light source units of the present invention in a low-beam pattern.

In the two condenser-type light source units LU1 and LU2 on the center side, the flat portion 23a (see FIG. 3A) of the sub-reflector 23 is tilted downward slightly to the left when seen from the front. This structure makes part of the light reflected on the main reflector 22 and then on the flat portion 23a be radiated left-upward direction relative to the horizontal line, thus creating predetermined light distribution patterns P1 and P2, respectively, having such horizontal and oblique cutlines as shown in and FIGS. 4A and 4B.

Figure 4B:
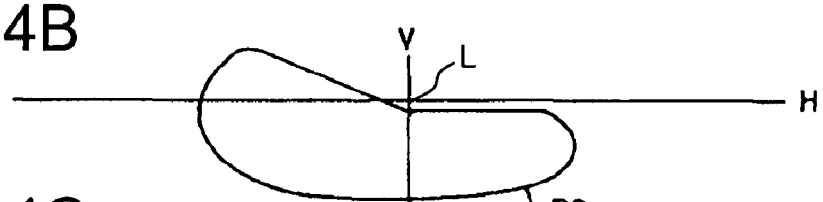

As shown in FIG. 4B, the irradiation range of the condenser-type light source unit LU2 is set to be wider than that of the condenser-type light source unit LU1.

Thus, the condenser-type light source units LU1 and LU2 illuminate an area in the proximity of the optical axis L of the lamp. More specifically, the condenser-type light source units LU1 and LU2 illuminate an area which is in front of the lamp and in the proximity of an extended line of the optical axis L of the lamp.

Figure 4C:
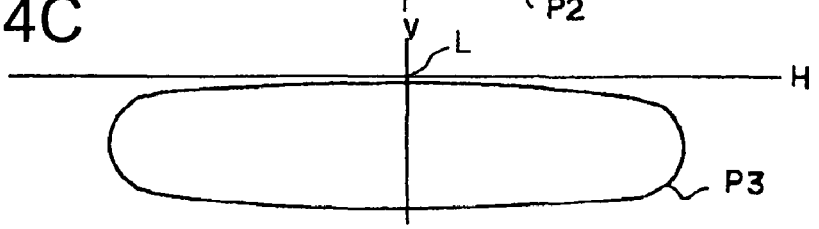

In the light source unit LU3, the flat portion 23a of the sub-reflector 23 is shaped flat in the horizontal direction. As a result, the sub-reflector 23 does not radiate light into the left upward direction with respect to the horizontal line. On the other hand, the unit LU3 is set to radiate light to a wider area than the light source unit LU2 does, so that the light distribution pattern P3 shown in FIG. 4C having only horizontal cutlines is produced.

Thus, the condenser-type light source unit LU3 illuminates an area that is further from the optical axis L of the lamp than the light source units LU1 and LU2. In other words, the light source unit LU3 illuminates an area that is in front of the lamp and is greater than and includes the area the light source units LU1 and LU2 illuminate.

Figure 3B:
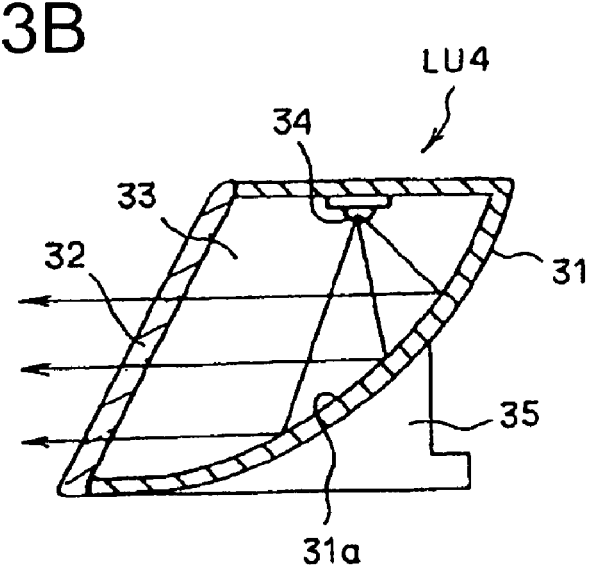

The diffusion-type light source unit LU4 (see FIG. 1) includes, as shown FIG. 3B, a reflector 31 that has a column axis in the horizontally lateral direction and curved in a radial fashion along the lower end surface. To the front opening of this reflector 31 is fitted a flat lens 32, defining a unit chamber 33. In this unit chamber 33, a plurality of LEDs 34 (four LEDs in this embodiment), which are the light sources, are installed and aligned on the focal axis along the horizontal column axis. To the reflector 31, a stem tube 35 is fitted integrally.

Figure 4D:
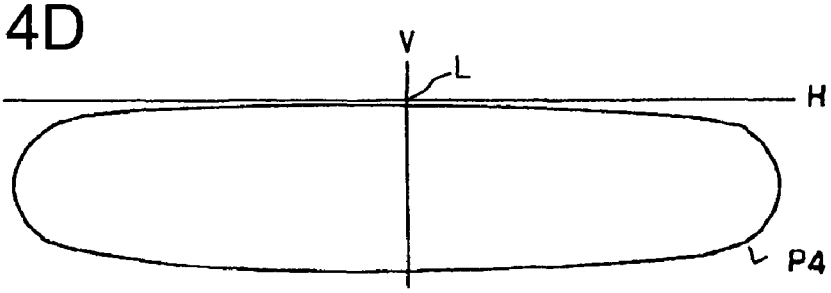

In the diffusion-type light source unit LU4 thus structured, each light beam emitted from the LEDs 34 is reflected on the radial face 31a of the reflector 31 to be aligned in parallel with each other in the vertical direction but is diffused in the lateral direction, and then the light is radiated forward after traveling through the flat lens 32. Accordingly, the light distribution pattern P4 that is diffused in a wide lateral range along and beneath the horizontal line H is produced as shown in FIG. 4D.

According to the shown embodiment described above, each of the condenser-type light source units LU1 and LU2 illuminate an area in the proximity of the optical axis of the lamp (more specifically, the condenser-type light source units LU1 and LU2 illuminate an area which is in front of the lamp and in the proximity of an extended line of the optical axis of the lamp) and is defined as a first light source unit in the present invention. On the other hand, each of the condenser-type light source unit LU3 and the diffusion-type light source unit LU4 illuminate an area that is further from the optical axis of the lamp than the first light source unit illuminates (more specifically, the light source unit LU3 and the diffusion-type light source unit LU4 illuminate an area that is in front of the lamp and is greater than and includes the area the first light source units illuminate) and is defined as a second light source unit in the present invention.

The three light source units LU1 to LU3 are provided in parallel with each other in the horizontal direction and installed on the upper step of a base plate 41 formed in a stepped configuration along the optical axis (see FIG. 1) and are fixed with the stem tube 24 in between (see FIG. 2). The diffusion-type light source unit LU4 is fixed to the lower step of the base plate 41 by a screw or other fastening means (not shown). The four light source units LU1 to LU4 are thus provided integrally by the base plate 41.

This base plate 41 is structured so that it can tilt in the vertical direction by, as shown in FIG. 2, means of a leveling mechanism 50 in the lamp body 11. More specifically, the upper back part of the base plate 41 projects backward and is provided with a spindle 51 that has a spherical part (ball) 51a at the end. The base plate 41 is supported rotatably at least in the vertical direction by means of a spherical bearing 52 fitted to the lamp body 11. At a part of the lamp body 11 where it faces the lower back part of a horizontal portion of the base plate 41, a leveling motor 53 is fixedly installed. The leveling motor 53 has a driving rod 53a that is movable forward and backward (left and right in FIG. 2) and is coupled to a part of the base plate 41. When the leveling motor 53 is actuated, the driving rod 53a moves forward and backward, and as a result, the base plate 41 tilts in the vertical direction around the spindle 51 with the ball 51a being the tilting point. It is, therefore, possible to adjust (change) the angles of the optical axes of the light source units LU1 to LU4 in the vertical direction.

Figure 4E:
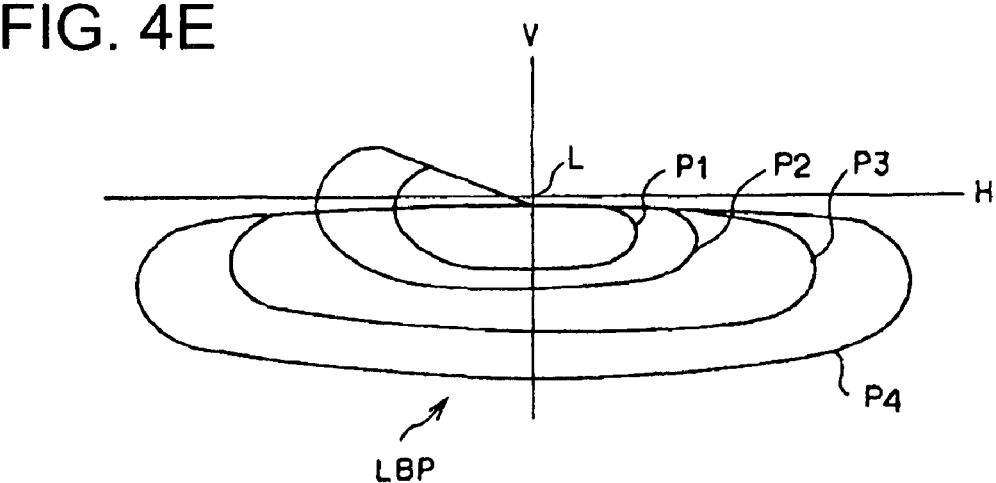

When both first and second light source units, namely the four light source units LU1 to LU4, emit light all at once, light beams emitted from the light source units LU1 to LU4 are superposed, and the light distribution patters P1 to P4 made by the four light source units LU1 to LU4 form a combined low-beam distribution pattern LBP shown in FIG. 4E. In this low-beam distribution pattern LBP, the amount of light from the light source unit LU1 is set high in the vicinity of horizontal and oblique cutlines so as to illuminate this area with high intensity, and this high-intensity area of the light distribution pattern P1 is a so-called hot zone. Moreover, when the angle of all the optical axes of the light source units LU1 to LU4 in the vertical direction is adjusted (changed) by the leveling motor, the entire low-beam distribution pattern shown in FIG. 4E is deflected in the vertical direction.

Figure 5:
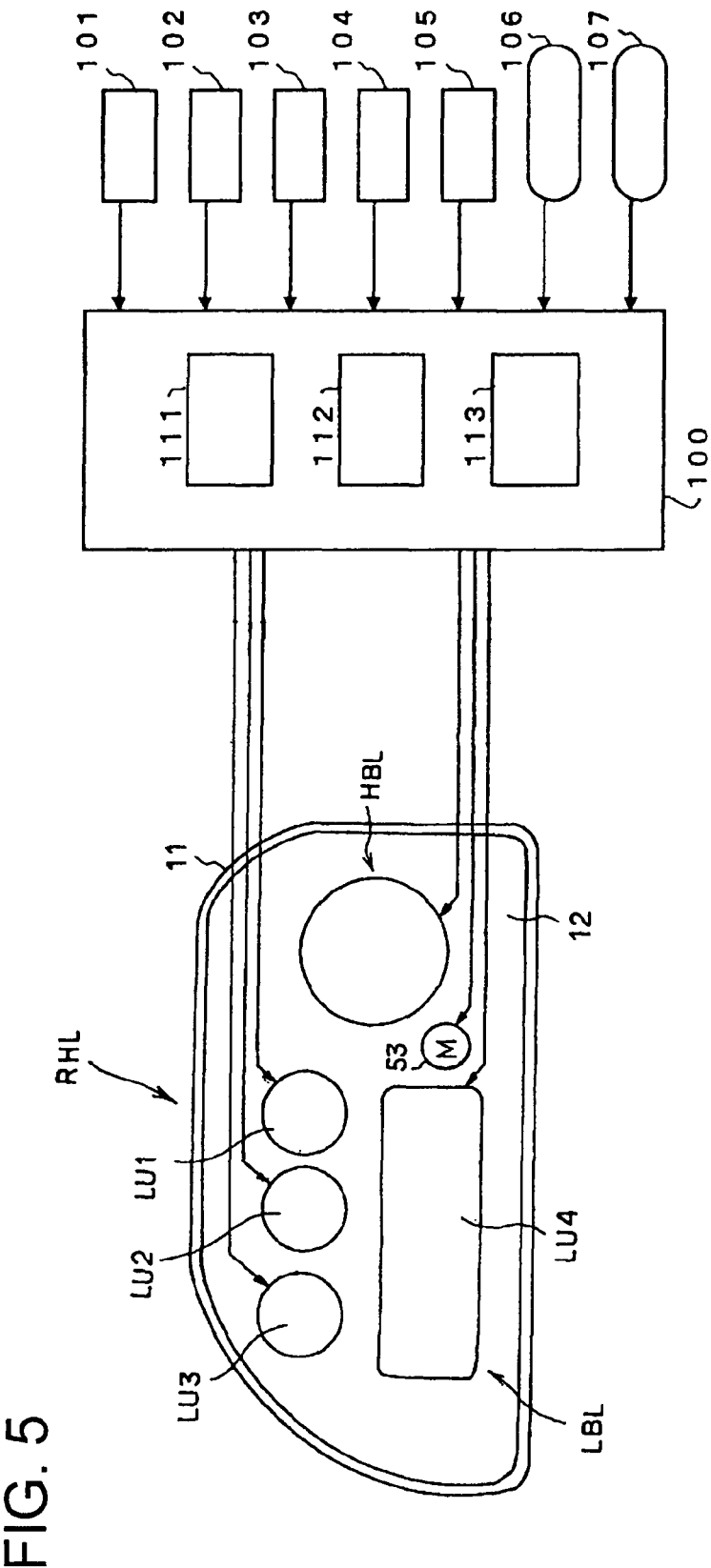
FIG. 5 shows the configuration of the lighting circuit used in the present invention.

FIG. 5 shows the configuration of a circuit that controls ON/OFF and the amount of light from the high-beam lamp HBL and low-beam lamp LBL and further controls the leveling motor 53.

More specifically, the circuit includes an electronic control unit (ECU) 100; and the high-beam lamp HBL, the light source units LU1 to LU4 that comprise the low-beam lamp LBL, and the leveling motor 53 are connected to the electronic control unit (ECU). Furthermore, a vehicle speed sensor 101 for detecting the vehicle's speed, a steering angle sensor 102 for detecting the vehicle's steering angle, a vehicle height sensor 103 for detecting the vehicle's inclination angle (pitch angle) in the vertical direction, an illuminance sensor 104 for detecting the brightness of the vehicle's ambient environment, and a raindrop sensor 105 for detecting the raindrops are all connected to the electronic control unit (ECU) 100, so that ECU 100 determines the vehicle's driving status based on the outputs of these sensors 101 to 105.

To the electronic control unit (ECU) 100, a light switch 106 operated by the driver of the vehicle, and a dimmer switch 107 provided integrally with this main switch and used for switching the high and low beams are further connected.

The ECU 100 includes a lighting control circuit 111. The lighting control circuit 111 makes selections of lighting the high-beam lamp HBL or the low-beam lamp LBL when the dimmer switch 107 is operated while the light switch 106 is switched on. The ECU 100 further includes a light amount control circuit 112 for controlling the light amount of the four light source units LU1 to LU4 so that they create a low-beam distribution pattern depending on the vehicle's driving status determined by the outputs of the sensors 101 to 105 when the low-beam lamp LBL is selected. Furthermore, the ECU 100 is provided with a leveling control circuit 113. The leveling control circuit 113 controls the rotation of the leveling motor 53 so as to deflect the optical axis of the low-beam lamp LBL (comprised of the light source units LU1 to LU4) in the vertical direction depending on the determined vehicle's driving status.

While the description of another headlamp on the left is omitted here, the left side headlamp has the same structure as the right side headlamp described above except that the arrangement of the high-beam lamp HBL, the low-beam lamp LBL, and the light source units LU1 to LU3 included in the low-beam lamp LBL are horizontally symmetrical to that of the right headlamp RHL.

The lighting operations of the thus-structured headlamp will now be described below.

With the light switch 106 is ON and the dimmer switch 107 is OFF, the ECU 100 causes the high-beam lamp HBL to light by means of the lighting control circuit 111. The projector-type lamp is thus lit and provides illumination of a predetermined high-beam distribution pattern.

When the dimmer switch 107 is turned on, the ECU 100 causes the low-beam lamp LBL to light by the lighting control circuit 111 so as to provide illumination in a low-beam distribution pattern. In the low-beam distribution pattern, the light source units LU1 to LU4 are lit. The light distribution patterns of the light source units LU1 to LU4 are as shown in FIGS. 4A to 4D. Light beams emitted from these light source units LU1 to LU4 are superposed as shown in FIG. 4E so as to provide illumination in the low-beam distribution pattern LBP having a horizontal cutline that is closely below the horizontal reference line H in an area on the right side of the optical axis L and an oblique cutline that extends a little upward of the horizontal reference line H in an area on the left side of the optical axis L.

At the same time, the ECU 100 determines various types of vehicle's driving modes for the low-beam distribution pattern LBP based on the outputs detected by the sensors 101 to 105. Here, the modes determined include: Suburban Cruising Mode, Middle-Beam Mode, and Urban Cruising Mode. Based on the mode that is determined by the ECU 100, the ECU 100 further controls, by means of the light amount control circuit 112, the amount of light from the light source units LU1 to LU4 of the low-beam lamp LBL. Furthermore, the ECU controls the leveling motor 53 by means of the leveling control circuit 113 based on the mode determined, as necessary, and the leveling mechanism 50 controls the optic angle of the light source units LU1 to LU4 in the vertical direction. The light amount and leveling control in each mode will be described below.

Suburban Cruising Mode (Low-Beam Mode)

The ECU 100 determines that it is Suburban Cruising Mode when the speed of the vehicle is detected through the output of the vehicle speed sensor 101 to be medium or lower and the illuminance in the ambient environment of the vehicle is detected through the output of the illuminance sensor 104 to be low. In other words, in Suburban Cruising Mode, the vehicle is driven at a medium speed in a suburban area that is not so well lit. Suburban Cruising Mode is, in a limited sense, Low-Beam Mode, and is hereinafter referred to as a Low-Beam Mode.

Figure 6A:
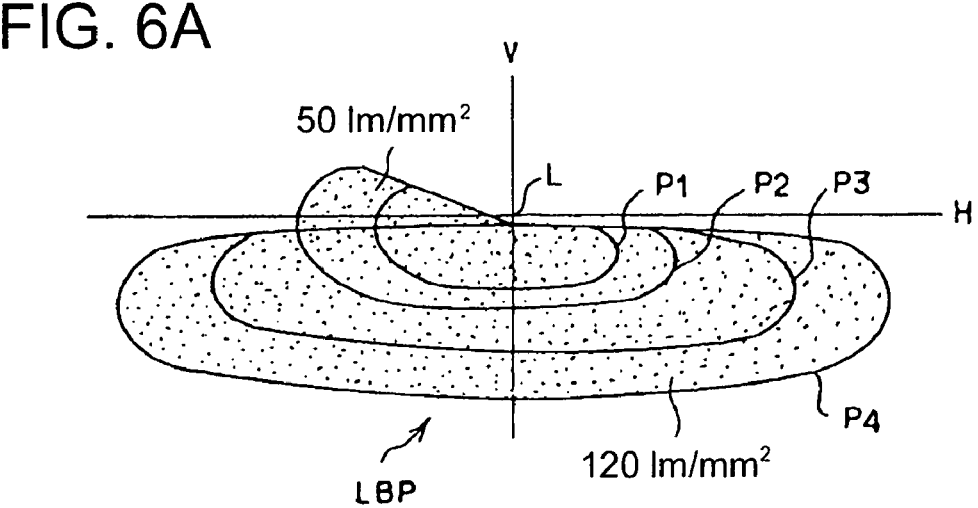
FIGS. 6A through 6C respectively show the light distribution patterns in Low-Beam, Middle-Beam, and Town Modes made by the lamp according to the present invention.

In Low-Beam Mode, the ECU 100 sets the amount of light from the light source units LU1 to LU4 at a default reference amount of light by the light amount control circuit 112. The reference amount of light sets the electric power (voltage) supplied to each light source unit at a predetermined power level and has a light distribution pattern as shown in FIG. 6A. This pattern is the same as the pattern shown in FIG. 4E, and an area of the light distribution pattern P1 is illuminated somewhat more brightly as a hot zone than other areas.

Figure 7A:
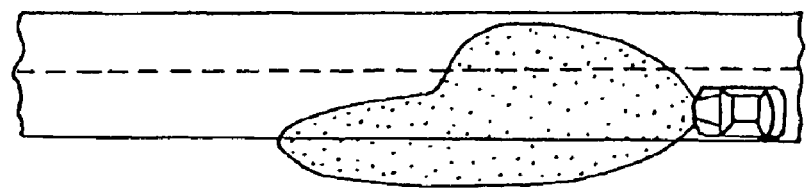
FIGS. 7A through 7C respectively show the light distribution characteristics on the road surfaces in Low-Beam, Middle-Beam, and Town Modes in the lamp of the present invention.

In this Middle-Beam Mode, the light distribution on the road surface takes the light distribution characteristics shown in FIG. 7A.

Middle-Beam Mode

The ECU 100 determines that it is Middle-Beam Mode when the speed of the vehicle is detected through the output of the vehicle speed sensor 101 to be mid-high speed that is higher than the medium speed and the illuminance in the ambient environment of the vehicle is detected through the output of the illuminance sensor 104 to be low. In other words, in Middle-Beam Mode, the vehicle is driven at a mid-high speed that is higher than the medium speed and lower than when it is on an expressway in a suburban area. Middle-Beam Mode is also referred to as a motorway mode.

In Middle-Beam Mode, the ECU 100 controls the light amount control circuit and increases the power supplied to the first light source units that illuminate an area in the proximity of the optical axis of the headlamp (In other words, the first light source units illuminate an area which is in front of the lamp and in the proximity of an extended line of the optical axis of the lamp). More specifically, the light source units LU1 and LU2 that respectively create the light distribution patterns P1 and P2 are supplied with higher electrical power. In Middle-Beam Mode, the ECU 100 further controls the light amount control circuit to decrease the power supplied to the second light source units that illuminate an area which is further from the optical axis of the headlamp (In other words, the second light source illuminates an area that is in front of the lamp and is greater than and includes the area the first light source units illuminates). More specifically, the light source units LU3 and LU4 that create the light distribution patterns P3 and P4 are supplied with less power.

Figure 6B:
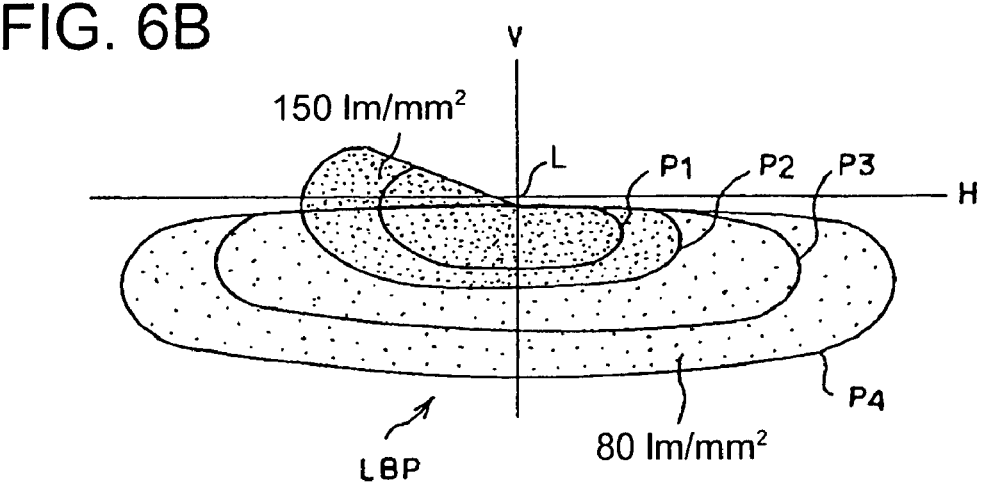

In the low-beam distribution pattern, as shown in FIG. 6B, the amount of light from the light source units LU1 and LU2, namely the first light source units, is raised to increase the brightness in the area in the proximity of the optical axis L of the headlamp, which the area these light source units LU1 and LU2 illuminate, and enhance the visibility in the area far in front of the vehicle. Accordingly, a light distribution pattern that is suitable for high- or middle-speed driving in a suburban area is provided. At the same time, the amount of light from the light source units LU3 and LU4, namely the second light source units, is lowered to somewhat decrease the brightness in the area just in front of the vehicle, which the area they illuminate. Generally, on an expressway, the driver pays rather little attention to checking the area just in front of the vehicle, the decrease in brightness will thus not cause adverse effects to the driving performance and rather enhance the visibility in the area far in front of the vehicle.

Figure 7B:
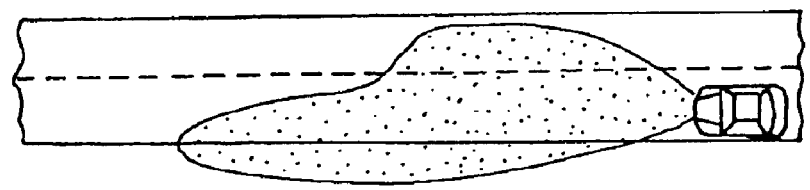

In Middle-Beam Mode, the light distribution on the road surface takes the light distribution characteristics shown in FIG. 7B.

Of the light source units LU1 to LU4 in Low-Beam Mode shown in FIG. 6A, the first light source units for creating the light distribution patterns P1 and P2 for the area in the proximity of the optical axis L of the headlamp provide a luminous intensity of 50 lm/mm$^2$, and the second light source units for creating the light distribution patterns P3 and P4 for the area just in front of the vehicle provide a luminous intensity of 120 lm/mm$^2$. On the contrary, in Middle-Beam Mode shown in FIG. 6B, the first light source units are increased in their luminous intensity to 150 lm/mm$^2$, and the second light source units illuminating the area just in front the vehicle are decreased in their luminous intensity to 80 lm/mm$^2$.

When the power consumed by the first and second light source units is proportional to the brightness, then the brightness can be converted into power consumption measured in watts (W), which is calculated as follows: 50+120=170 (W) in Low-Beam Mode, and 150+80=230 (W) in Middle-Beam Mode. In other words, in Middle-Beam Mode, the power consumption increases by 60 (W). However, when this 230 (W) power consumption in Middle-Beam Mode according to the embodiment is compared to a power consumption of 150+120=270 (W) in which only the brightness provided by the first light source units is increased to 150 lm/mm$^2$ and the brightness provided by the second light source units is kept at 120 lm/mm$^2$, then an increase of power consumption can be as low as 40 (W).

As seen from the above, in Middle-Beam Mode, so as to provide illumination in a light distribution pattern that is suitable for high-speed driving in a suburban area, the power supplied to the light source units LU1 and LU2, which are the first light source units, is raised to increase the amount of light from these units; and the power supplied to the light source units LU3 and LU4, which are the second light source units, is lowered to decrease the amount of light from these units. It is, therefore, possible to prevent an increase in the total power consumed by the headlamp compared with simply increasing the power supplied to the light source units LU1 and LU2. In some cases, a larger cut in the power supplied to the light source units LU3 and LU4 can further decrease the total power consumed by the headlamp.

It can be designed in Middle-Beam Mode that the power supplied to either one of the light source units LU1 and LU2, which are the first light source units, is increased, while the power supplied to only the light source unit LU4 out of the light source units LU3 and LU4, which are the second light source units, is decreased.

Figure 8A:
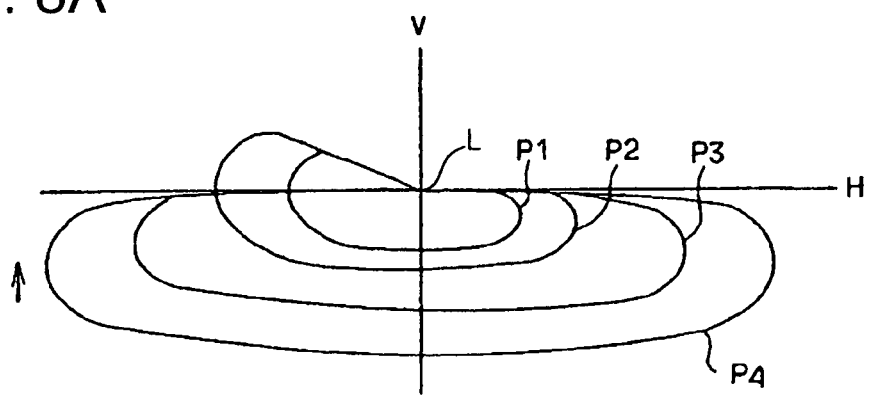
FIGS. 8A and 8B respectively show the light distribution patterns during the leveling control by a leveling control means in Middle-Beam and Town Modes made by the lamp according to the present invention.

Furthermore, in Middle-Beam Mode, when the speed of the vehicle is in a higher-speed range that is higher than the mid-high speed, the ECU 100 can be operated so as to control the leveling motor 53 by means of the leveling control circuit 113 to tilt the base plate 41, thus changing the optical axis of the low-beam lamp LBL, that is, the optical axes of the light source units LU1 to LU4, in the vertical direction so that the low-beam lamp LBL is directed into a higher level. For example, when the optical axes of the light source units LU1 to LU4 are tilted upwardly for a predetermined angle, such a light distribution pattern that the horizontal cutline is lifted toward a position along the horizontal reference line H and the hot zone near the optical axis extends farther as shown in FIG. 8A is produced. In this case, the ECU 100 performs leveling control by recognizing the pitch angle of the vehicle based on the output detected by the vehicle height sensor 103 so as not to dazzle the drivers of vehicles travelling in the opposite direction by the horizontal cutline that exceeds the horizontal reference line H with the upper area being illuminated. As a result, the visibility in the area far in front of the vehicle is further enhanced compared to the light distribution pattern in Middle-Beam Mode in which the leveling control is not made as shown in FIG. 6B.

Town Mode (Urban Cruising Mode)

The ECU 100 determines that it is Town Mode when the speed of the vehicle is detected through the output of the vehicle speed sensor 101 to be low and the illuminance in the ambient environment of the vehicle is detected through the output of the illuminance sensor 104 to be comparatively high. In other words, in Town Mode, the vehicle is driven at a low speed in an urban area.

Figure 6C:
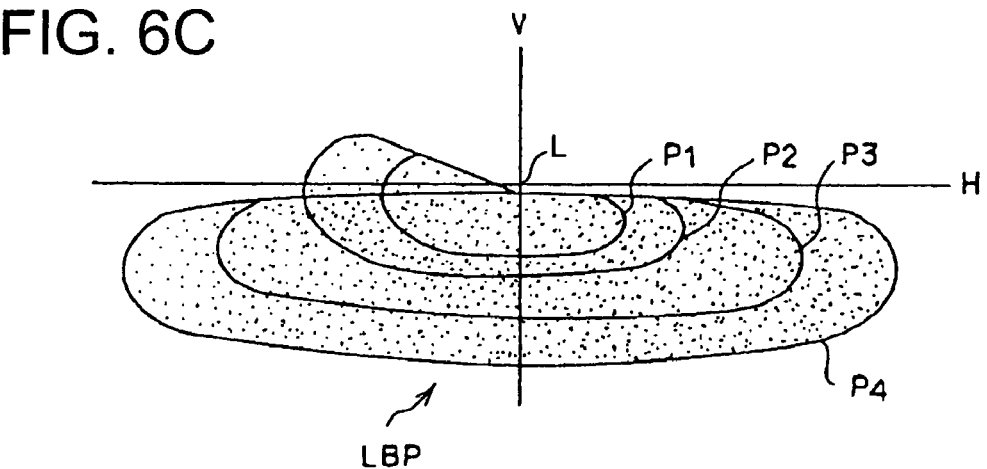

In Town Mode, the ECU 100 controls the light amount control circuit 112 so as to decrease the power supplied to the light source units LU1 and LU2 which are the first light source units illuminating an area in the proximity of the optical axis of the headlamp, and the ECU 100 also controls the light amount control circuit 112 so as to increase the power supplied to the light source units LU3 and LU4, which are the second light source units. Thus in the low-beam distribution pattern LBP, as shown in FIG. 6C, the amount of light from the light source units LU3 and LU4 is raised to increase the brightness in the light distribution patterns P3 and P4 for the area just in front of the vehicle illuminated by these units, thereby enhancing the visibility in the area just in front of the vehicle, which is required for urban driving. At the same time, the amount of light from the light source units LU1 and LU2 is lowered to decrease the brightness in the light distribution patterns P1 and P2 for the area in the proximity of the optical axis of the headlamp, which the area they illuminate. However, this will cause no harm to urban driving, since there is no particular need to enhance the visibility in the area far in front of the vehicle.

Figure 7C:
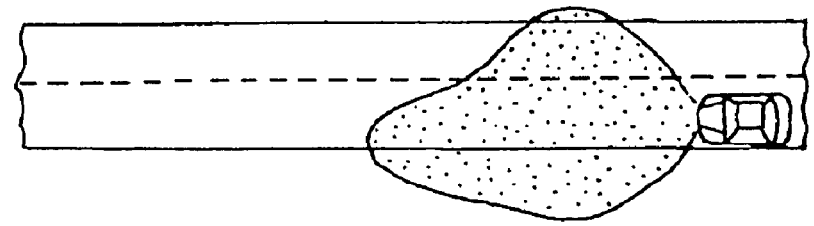

In Town Mode, the light distribution on the road surface takes the light distribution characteristics shown in FIG. 7C.

Though the specific numeric values will not be described, in Town Mode, the brightness provided by the light source units LU3 and LU4, which are the second light source units, is increased while the brightness provided by the light source units LU1 and LU2, which are the first light source units, is decreased compared to Low-Beam Mode. Accordingly, it is assuredly possible to prevent an increase in the total power consumption of the lamp on the whole, with the decrease in brightness provided by the first light source units, compared to the case that simply increasing the brightness provided by the second light source units.

As described above, in Town Mode, so as to provide illumination in a light distribution pattern that is suitable for low-speed driving in an urban area, the power supplied to the light source units LU3 and LU4 is raised to increase the amount of light from these units, while the power supplied to the light source units LU1 and LU2 is lowered to decrease the amount of light from these units. Accordingly, it is possible to prevent an increase in the total power consumed by the headlamp compared with simply increasing the power supplied to the light source units LU3 and LU4. In particular, a possible large cut in power supplied to the light source units LU1 and LU2 can further decrease the total power consumption of the headlamp.

In Town Mode, the power supplied to either one of the light source units LU1 and LU2, which are the first light source units, can be decreased while the power supplied to only the light source unit LU4 out of the second light source units can be increased.

Figure 8B:
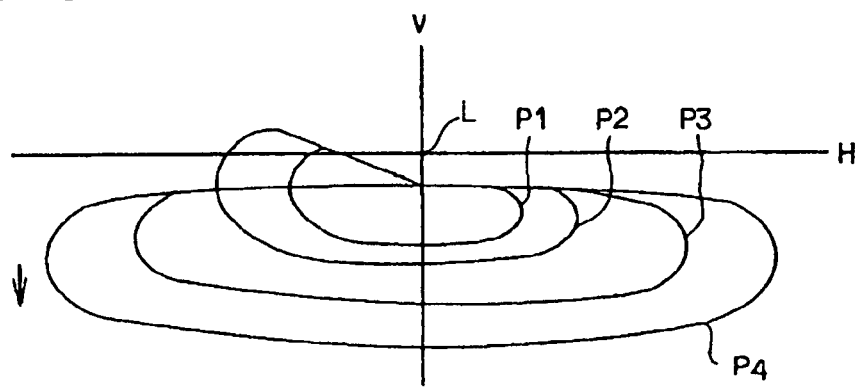

It is possible to design so that when the speed of the vehicle is in a lower-speed range which is lower than low speed or when the vehicle stops, then the ECU 100 controls the leveling motor 53 by means of the leveling control circuit 113 so as to tilt the base plate 41 and control the optical axis of the low-beam lamp LBL, that is, the optical axes of the light source units LU1 to LU4 are controlled in the vertical direction. For example, when the optical axes of the light source units are tilted downwardly for a predetermined angle, sch a light distribution pattern that the horizontal cutline is further lowered on the right side and the area in the vicinity of the optical axis extends toward the area immediately in front of the lamp as shown in FIG. 8B is produced. In this case, the ECU 100 appropriately adjusts the downward inclination angle of the optical axis through leveling control by recognizing the pitch angle of the vehicle based on the output detected by the vehicle height sensor 103. Accordingly, the visibility in an area just in front of the vehicle is further enhanced compared with the light distribution pattern in Town Mode in which no leveling control is made as shown in FIG. 6C, and it is possible to prevent dazzling pedestrians as well as the drivers of preceding or oncoming vehicles in urban driving.

As described above, in the headlamp of the shown embodiment, in both Middle-Beam Mode and Town Mode, the amount of light from the light source units illuminating an area where the high visibility is required in the respective driving status is increased so as to enhance the brightness for that area and create a light distribution pattern which is suitable for safe driving. Furthermore, in the headlamp of the shown embodiment, by way of lowering the amount of light from the light source units that illuminate an area where the visibility is less required so as to decrease the brightness for that area to a degree that does not have adverse effects, it is possible to prevent an increase in power consumption for lighting the headlamp without compromising the entire brightness for an area in front of the vehicle. Furthermore, by controlling to deflect the optical axis in the vertical direction at the same time as controlling the amount of light in each mode, it is possible to further enhance the visibility for an area where the high visibility is required in each mode and enhance driving safety.

In the shown embodiment, Middle-Beam Mode and Town Mode are described as an example of control on the amount of light from the light source units. In the present invention, it is further possible to control the headlamp in Rainy Weather Driving Mode (Wet Mode), in which the road surface is wet due to rain, etc. and it is determined based on the output detected by the raindrop sensor 105, and in Curve Driving Mode (Cornering Mode), in which the road is curved right and left, and it is determined based on the output detected by the steering angle sensor 102. In other words, in the shown embodiment of the present invention, in both Wet Mode and Cornering Mode, it is possible to increase the amount of light from the light source units out of a plurality of light source units that illuminate an area where the high visibility is required while decreasing the amount of light from the light source units that illuminate an area where the visibility is less required for other driving modes. It is thus possible to enhance the driving safety and to decrease the power consumption.

In the above-described embodiment, the amount of light from each one of the four light source units is controlled independently. However, it is also possible to control the plurality of light source units simultaneously. For example, the amount of light from the light source units LU1 and LU2, which are the first light source units, can be controlled at the same time, and the amount of light from the light source units LU3 and LU4, which are the second light source units, can be controlled simultaneously. In this setting, the light source units LU1 and LU2 are connected to the ECU 100 by a single control line, and the light source units LU3 and LU4 are also connected to the ECU 100 by a single control line, so that the amount of light from each set is controlled uniformly. It is thus possible to reduce the number of control lines and simplify the structure of the internal circuit of the ECU 100.

In the shown embodiment, the low-beam lamp is comprised of three condenser-type light source units and one diffusion-type light source unit. However, it is indeed possible to form the low-beam lamp with different numbers of light source units. In addition, it should be noted that the first and second light source units of the present invention are not limited to the combinations of the light source units LU1 and LU2 and LU3 and LU4 as described in the embodiment.

The invention claimed is:

1. A vehicular headlamp comprising a plurality of light source units each having light-emitting elements as light sources thereof and synthesizes illumination light emitted from each of the light source units to create a predetermined light distribution pattern, wherein
   said plurality of light source units are provided with a common lamp body,
   the vehicular headlamp is further provided with a light amount control means for controlling an amount of light from at least two of the light source units of said plurality of light source units, and
   the light amount control means performs contrasting control to increase an amount of light from at least one of the light source units of said at least two of said light source units while decreasing an amount of light from at least another of the light source units of said at least two of said light source units, and
   the at least one of the light source units comprises a first light source unit that illuminates an area in a proximity of an optical axis of the lamp, and the at least another of said light source units comprises a second light source unit that illuminates an area that is greater than and includes the area where the first light source unit illuminates;
   an amount of light from the first light source unit and an amount of light from the second light source unit are controlled by said light amount control means so as to be opposite from each other; and
   said second light source unit illuminates an area directly in front of said vehicle and said first light source unit illuminates an area in front of said area illuminated by said second light source unit.

2. The vehicular headlamp according to claim 1, wherein the first light source unit includes a condenser-type light source unit, and
   the second light source unit includes a diffusion-type light source unit.

3. The vehicular headlamp according to claim 1, wherein in a middle-beam mode of a vehicle, the amount of light from the first light source unit is increased and the amount of light from the second light source unit is decreased.

4. The vehicular headlamp according to claim 3, wherein the vehicular headlamp is provided with a leveling control means for controlling optical axes of the plurality of light source units to deflect in a vertical direction, and
   the leveling control means controls the optical axes of the plurality of light source units to deflect upwardly in the middle-beam mode and controls the optical axes of the plurality of light source units to deflect downwardly in the town mode.

5. The vehicular headlamp according to claim 1, wherein in a town mode of a vehicle, the amount of light from the first light source unit is decreased and the amount of light from the second light source unit is increased.

6. The vehicular headlamp according to claim 5, wherein the vehicular headlamp is provided with a leveling control means for controlling optical axes of the plurality of light source units to deflect in a vertical direction, and
   the leveling control means controls the optical axes of the plurality of light source units to deflect upwardly in the middle-beam mode and controls the optical axes of the plurality of light source units to deflect downwardly in the town mode.

* * * * *